(12) United States Patent
Kotsusa (10) Patent No.: US 6,899,629 B2
(45) Date of Patent: May 31, 2005

(54) ELASTIC COUPLER (75) Inventor: Takayoshi Kotsusa, Fujisawa (JP)

(73) Assignee: NOK-Vibracoustic Co., LTD, Tokyo (JP)

(*) Notice: Subject to any disclaimer, the term of this patent is extended or adjusted under 35 U.S.C. 154(b) by 0 days.

(21) Appl. No.: 10/432,614

(22) PCT Filed: Dec. 20, 2001

(86) PCT No.: PCT/JP01/11189
§ 371 (c)(1),
(2), (4) Date: Jun. 4, 2003

(87) PCT Pub. No.: WO02/50441
PCT Pub. Date: Jun. 27, 2002

(65) Prior Publication Data
US 2004/0037630 A1 Feb. 26, 2004

(30) Foreign Application Priority Data
Dec. 20, 2000 (JP) .......................... 2000-386277

(51) Int. Cl.⁷ ................................. F16D 3/62
(52) U.S. Cl. ............................. 464/69; 464/93; 57/902
(58) Field of Search .......................... 464/69, 93, 137; 57/21, 201, 902

(56) References Cited

U.S. PATENT DOCUMENTS

| | | | | |
|---|---|---|---|---|
| 1,270,053 A | * | 6/1918 | Ream .................... 57/201 X |
| 3,745,757 A | * | 7/1973 | Selwood | |
| 4,118,952 A | * | 10/1978 | Kobayashi ............... 464/69 |
| 4,429,523 A | * | 2/1984 | Kajita et al. | |
| 4,718,224 A | * | 1/1988 | Obata ................... 57/902 X |
| 4,790,794 A | * | 12/1988 | Takeda et al. ............ 464/93 |
| 5,198,307 A | * | 3/1993 | Bourgois et al. .......... 57/902 X |
| 5,330,387 A | * | 7/1994 | Miyakawa ............... 464/93 |
| 5,609,014 A | | 3/1997 | Obara et al. ............. 57/212 |

FOREIGN PATENT DOCUMENTS

| | | | | |
|---|---|---|---|---|
| EP | 0840036 A1 | 5/1998 | | |
| GB | 321999 | * 11/1929 | ............... 464/93 |
| IT | 530946 | * 12/1957 | ............... 464/93 |
| JP | 3-96718 | * 4/1991 | ............... 464/69 |
| JP | 3-91526 | 9/1991 | | |
| JP | 4-101024 | 9/1992 | | |
| JP | 5-64536 | 8/1993 | | |
| JP | 5-302283 | 11/1993 | | |
| JP | 6-307463 | 11/1994 | | |
| JP | 7-33852 | 4/1995 | | |
| JP | 10-141445 | 5/1998 | | |
| JP | 2000-55072 | 2/2000 | | |

* cited by examiner

*Primary Examiner*—Greg Binda
(74) *Attorney, Agent, or Firm*—Jacobson Holman PLLC

(57) ABSTRACT

In order to make it possible to improve a durability of a cord wound around a connection element and to downsize a cord wound portion, in an elastic coupling structured such that connection elements connected to a drive side yoke and connection elements connected to a driven side yoke are alternately arranged on a circumference, cords are wound around each of the mutually adjacent connection elements so as to form a band shape, and the connection elements and the cords are coated by an elastic material. A single yarn having a twist number of 10 times per 10 cm or less is used as the cords.

2 Claims, 8 Drawing Sheets

PRIOR ART

FIG. 8

PRIOR ART

ELASTIC COUPLER

This is a nationalization of PCT/JP01/11189 filed Dec. 20, 2001 and published in Japanese.

TECHNICAL FIELD

The present invention relates to an elastic coupling which is used as a flexible joint in a motor vehicle drive system or the like.

BACKGROUND ART

Figure 6:
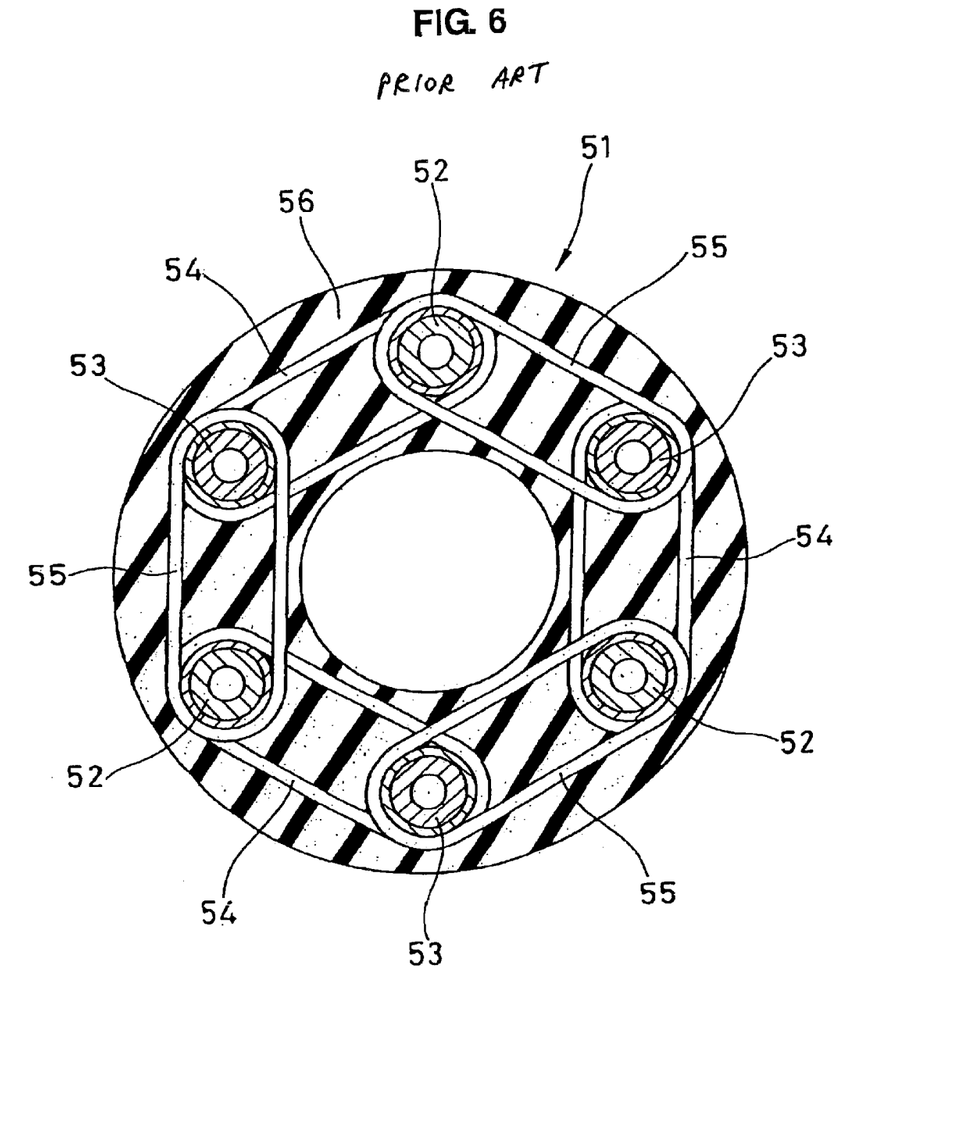
FIG. 6 is a cross sectional view of an elastic coupling in accordance with a conventional embodiment.

In conventional systems, as shown in FIG. 6, there has been known an elastic coupling 51 in which connection elements 52 connected to a drive side yoke in a rotation drive system of a motor vehicle and connection elements 53 connected to a driven side yoke are alternately arranged on a circumference, cords 54 and 55 are wound around every mutually adjacent connection elements 52 and 53 so as to form a band shape, and the connection elements 52 and 53 and the cords 54 and 55 are coated by an elastic material 56 such as a rubber or the like (for example, refer to Japanese Patent Publication No. 7–33852).

Figure 7:
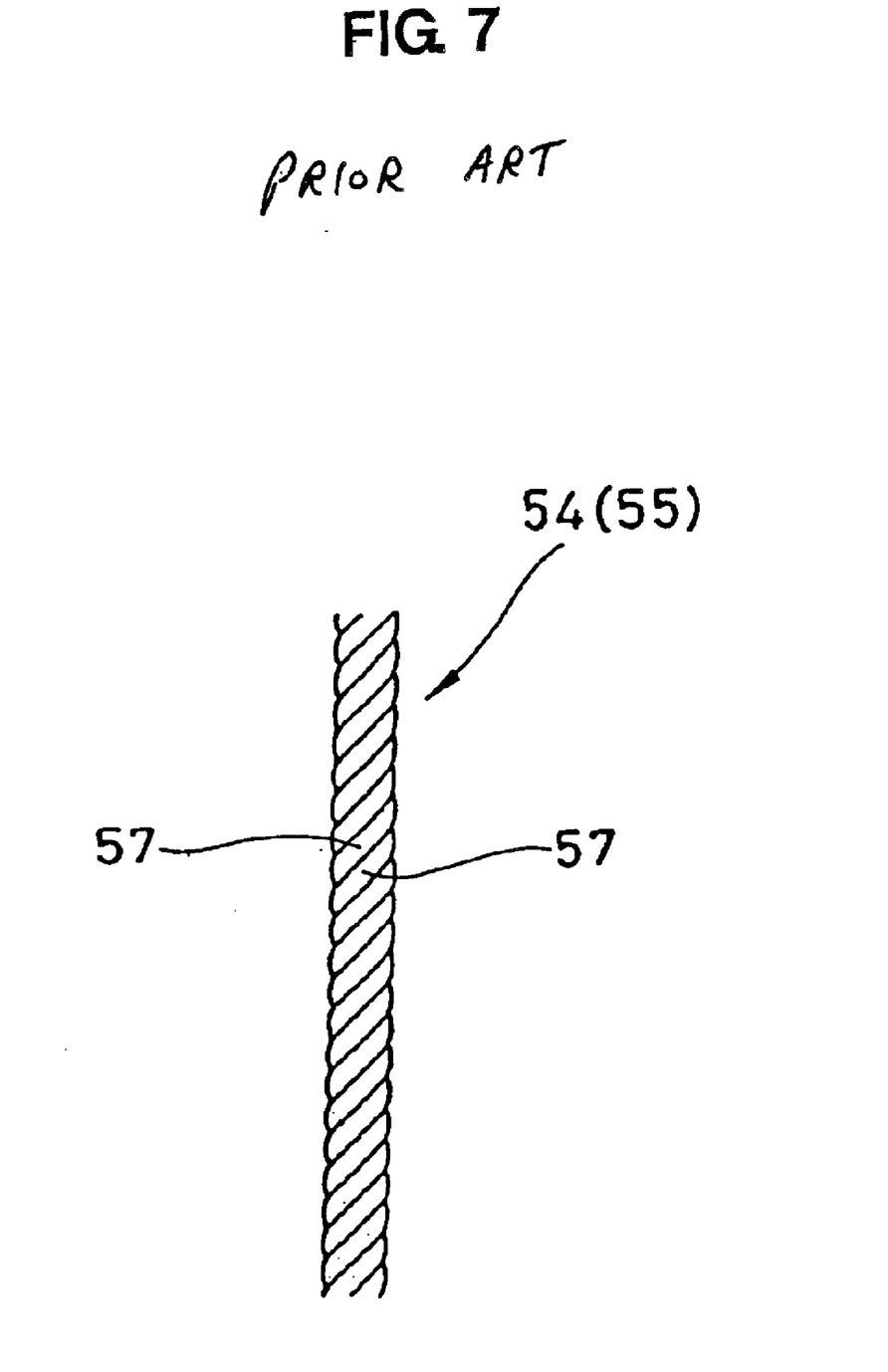
FIG. 7 is a partly enlarged view of a cord used in the elastic coupling.

However, in this conventional elastic coupling 51, a two folded yarn (total of about 3000 tex), obtained by bundling two single yarns 57 having about 15000 tex as shown in FIG. 7, is used as the cords 54 and 55. In the two folded yarn, both of a number of upper twists and number of lower twists are about 30 to 40 times per 10 cm, a thickness of the cords 54 and 55 in this state of two folded yarn is about $\phi 0.7$ mm, and a cross sectional shape thereof is substantially a circular cross section.

Figure 8:
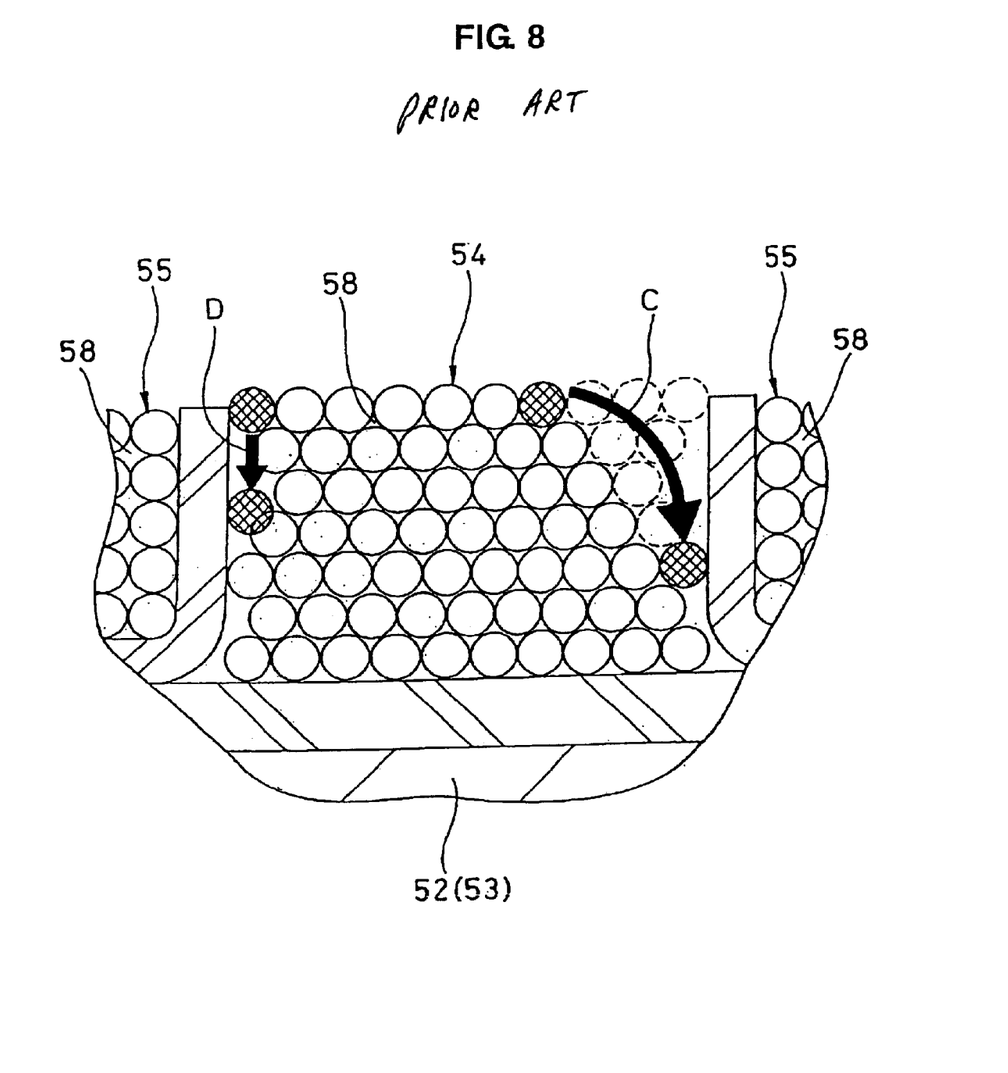
FIG. 8 is a schematic view showing a problem in the elastic coupling.

Accordingly, when winding the cords 54 and 55 having the thickness and the cross sectional shape mentioned above around outer peripheries of the connection elements 52 and 53 several times over, minute gaps 58 are formed between the cords 54 and 55, as shown in FIG. 8, a thick winding tends to be partly generated unless the cords are wound by an accurate feeding amount (pitch), whereby a displacement (an arrow C) of the cords 54 and 55 tends to be generated at a time of winding.

Further, when using the structure in the state mentioned above as it is, a particular wound portion digs into an inner peripheral side by a tensile force applied to the cords 54 and 55 at a time of transmitting a torque (an arrow D), so that a dispersion is generated in a magnitude of the tensile force between an inner peripheral side and an outer peripheral side as well as a slack is generated in the wound portion in the outer peripheral side. Accordingly, there is a case that a durability of the cords 54 and 55 is reduced for this cause. Further, since no slack is generated in inner peripheral portions which are in contact with cords 54 and 55 wound around the connection elements 52 and 53, a disconnection is early generated, the disconnected portion gradually expands to the outer peripheral side, and there is a case that the cords run into a breakage.

Further, since the two folded yarn formed by further bundling the single yarns (bundles of filaments) with each other is conventionally used as mentioned above, each of the filaments is arranged with a comparatively large angle with respect to a torque transmitting direction. However, it is preferable in strength of the filament that a force is applied to each of the filaments in a state in which each of the filaments is arranged in parallel to the torque transmitting direction, and by so doing, a torque transmission rate is improved. In regard to this point, in the case of the conventional two folded yarn mentioned above, since the overlapped filaments of the two folded yarns are rubbed with each other with an angle, there can be considered that strength of the filament is reduced and durability of the filament is reduced.

The present invention is made by taking the above points into consideration, and an object of the present invention is to provide an elastic coupling which can improve a durability of a cord wound around a connection element, and can downsize a cord wound portion.

DISCLOSURE OF THE INVENTION

In order to achieve the object mentioned above, in accordance with a first aspect of the present invention, there is provided an elastic coupling, in which connection elements connected to a drive side yoke and connection elements connected to a driven side yoke are alternately arranged on a circumference, cords are wound around each of the mutually adjacent connection elements so as to form a band shape, and the connection elements and the cords are coated by an elastic material, wherein single yarn is used as the cords.

Further, in accordance with a second aspect of the present invention, there is provided an elastic coupling, in which connection elements connected to a drive side yoke and connection elements connected to a driven side yoke are alternately arranged on a circumference, cords are would around each of the mutually adjacent connection elements so to form a band shape, and the connection elements and the cords are coated by an elastic material, wherein a single yarn having a twist number of 10 times per 10 cm or less is used as the cords.

Further, in accordance with a third aspect of the present invention, there is provided an elastic coupling, in which connection elements connected to a drive side yoke and connection elements connected to a driven side yoke are alternately arranged on a circumference, cords are wound around each of the mutually adjacent connection elements so as to form a band shape, and the connection elements and the cords are coated by an elastic material, wherein a single yarn having a twist number of 10 times per 10 cm or less is used as the cords.

Further, in accordance with a third aspect of the present invention, there is provided an elastic coupling, in which connection elements connected to a drive side yoke and connection elements connected to a driven side yoke are alternately arranged on a circumference, cords are wound around each of the mutually adjacent connection elements so as to form a band shape, and the connection elements and the cords are coated by an elastic material, wherein the cords employ a cord formed by bundling a plurality of single yarns each having a twist number of 10 times per 10 cm or less at bundling a twist number of 10 times per 10 cm or less.

Further, in accordance with a fourth aspect of the present invention, there is provided an elastic coupling, in which connection elements connected to a drive side yoke and connection elements connected to a driven side yoke are alternately arranged on a circumference, cords are wound around each of the mutually adjacent connection elements so as to form a band shape, and the connection elements and the cords are coated by an elastic material, wherein the cords employ a bundle of filaments having unspecified cross sectional shapes.

Further, in accordance with a fifth aspect of the present invention, there is provided an elastic coupling, in which connection elements connected to a drive side yoke arid connection elements connected to a driven side yoke are alternately arranged on a circumference, cords are wound around each of the mutually adjacent connection elements so as to form a band shape, and the connection elements and the cords are coated by an elastic material, wherein the cords employ a bundle of filaments having uneven cross sectional shapes.

Since the cross sectional shape of the cord which is constituted by one or a plurality of single yarns and has zero or a small twist number is not a uniform shape, the gap is hardly generated between the cords even when winding the cord around the connection element, and no catch is generated at a time of winding. Accordingly, the partially thick winding is hardly generated. Therefore, since the cord can be wound densely in comparison with the conventional one, the displacement at a time of winding and the slack due to the digging at a time of transmitting the torque are hardly generated, so that a uniform tensile force is applied to a whole of the cord.

Further, since the cord is wound densely in comparison with the conventional one, an occupied cross sectional area in the case of winding at particular turns is reduced.

Further, as a result of the present inventors having devoted themselves to research, it is found that the cord capable of achieving these operations is the cord constituted by the single yarn, the cord constituted by the single yarn having the twist number of 10 times per 10 cm or less, the cord formed by bundling a plurality of single yarns each having the twist number of 10 times per 10 cm or less at the bundling twist number of 10 times per 10 cm or less, the cord constituted by the bundle of filaments in which the cross sectional shapes are unspecified (noncircular cross sectional shapes), the cord constituted by the bundle of filaments in which the cross sectional shapes are uneven (uneven cross sectional shapes), and the like.

In this case, the present proposal includes the following technical matters.

That is, in order to achieve the object mentioned above, one elastic coupling proposed by the present application is an elastic coupling in which drive side and driven side yokes and connection elements (shafts and bobbins) connected to the respective yokes are arranged on a circumference by a uniform interval, cords are wound around the mutually adjacent connection elements, so as to form a band shape, and they are coated by an elastic material (a rubber or the like), wherein the cords are constituted by a single yarn and a twist number is set to 10 times per 10 cm or less. Further, the cord is formed by bundling a plurality of single yarns each having the twist number of 10 times per 10 cm or less at the bundling twist number of 10 times per 10 cm or less.

Further, the cord used in the elastic coupling shall be described as follows in comparison with a reinforcing cord of a tire for a motor vehicle.

That is, the cord used in the elastic coupling has conventionally employed the same kind of cord as the reinforcing cord of the tire for the motor vehicle, however, since the cord is wound flat in the case of the tire, the problem in the elastic coupling is not generated. Further, in the case of the tire exposed to a great deformation, increasing the number of twists is effective as a method of increasing a breaking elongation so as to improve durability, however, in the case that a number of winding stages is large such as in the elastic coupling, the large number of twists causes an adverse effect.

Further, since the cord (single yarn) is generally formed by bundling about 300 to 600 filaments, for example, for making a diameter (a wire diameter) thereof about 0.7 mm, in the case of bundling 600 filaments for example, the diameter (a wire diameter) of the filament becomes about 0.028 mm. As a material of the cord (single yarn), a nylon, a polyester, an aramid fiber, a carbon fiber and the like can be considered.

Further, in the case of the present invention, the number of twists in the single yarn is basically zero, however, the number of twists is preferably about 0 to 5 times per 10 cm in connection with handling. About 5 times per 10 cm can prevent snag and is easily handled, and when the number is over about 10 times per 10 cm, a portion in which the filaments cross to each other so as to be in contact with each other is increased, in a state of the single yarn being wound, and there is a possibility that the filaments are rubbed with each other and disconnected. When the number becomes over 15 times per 10 cm, a frequency of the above matter is further increased. Accordingly, this case is not preferable.

In the case of the present invention, since the number of twists is small, it is possible to prevent the filaments from being in contact with each other by a great angle, durability is improved, and each of the filaments is arranged in a state of being in parallel to the torque transmitting direction, so that durability is improved, and a torque transmission rate is improved.

BEST MODE FOR CARRYING OUT THE INVENTION

Next, a description will be given of an embodiment in accordance with the present invention with reference to the accompanying drawings.

Figure 1:
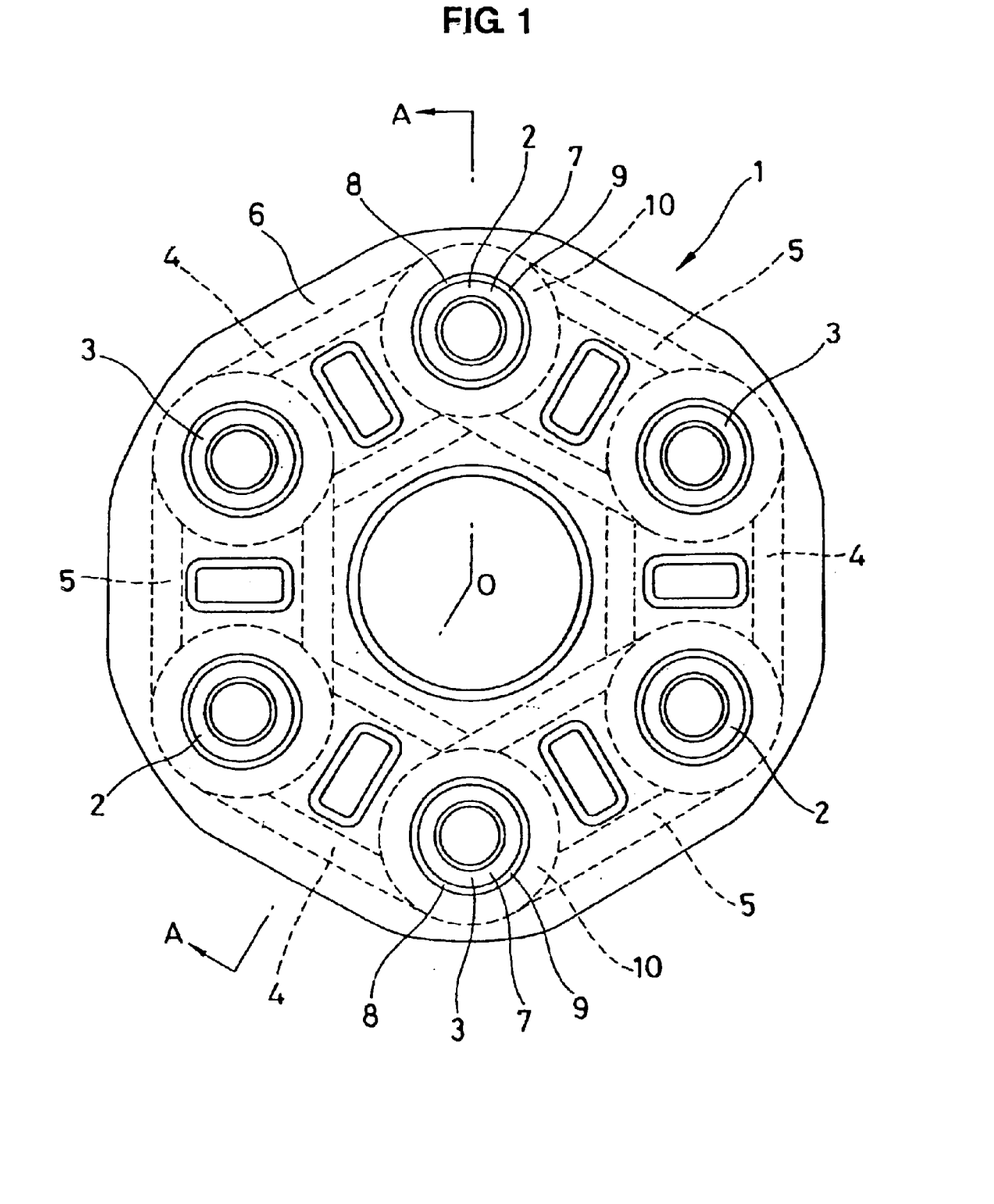
FIG. 1 is a front view of an elastic coupling in accordance with an embodiment of the present invention.
Figure 2:
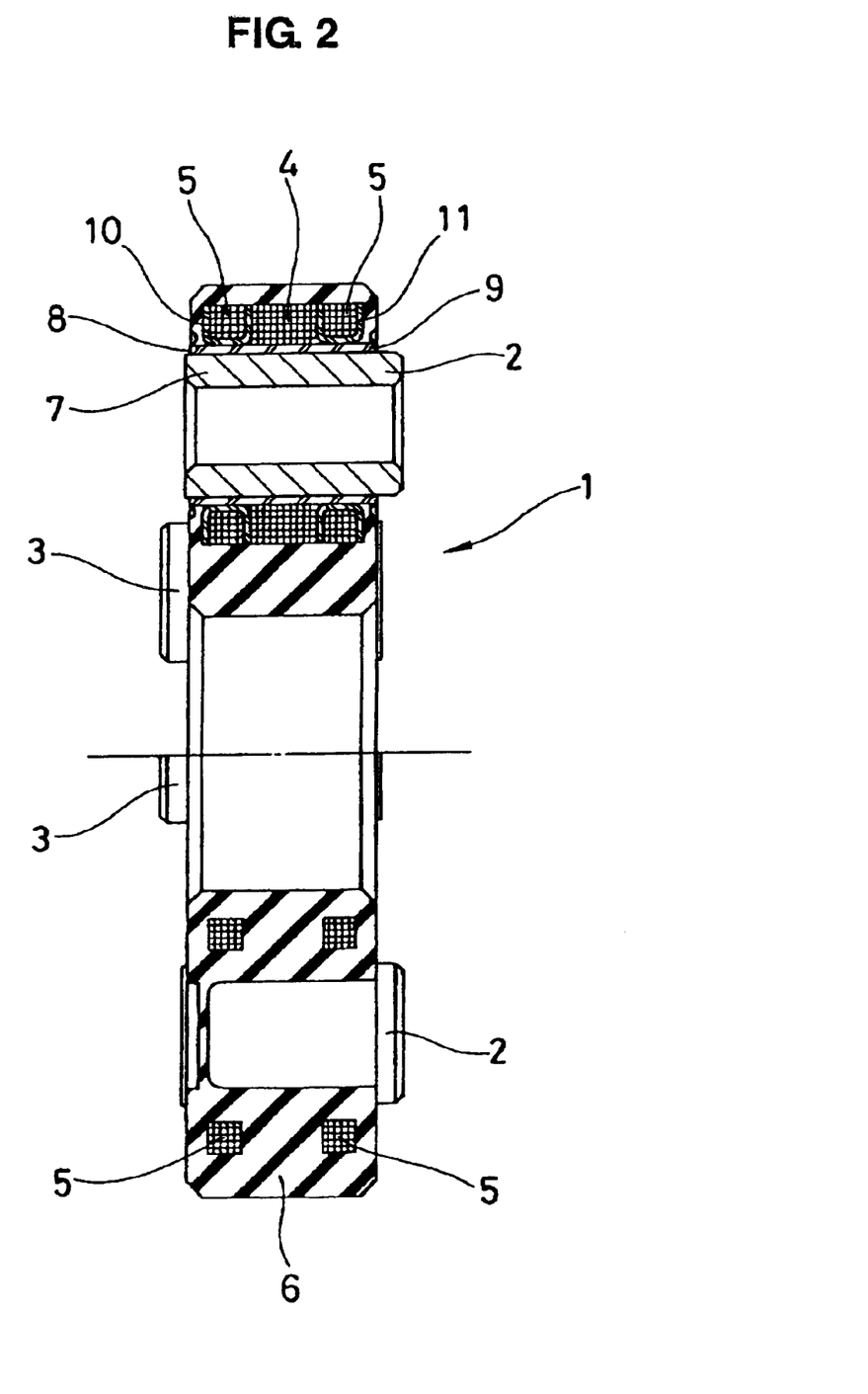
FIG. 2 is a cross sectional view along a line A-O-A in FIG. 1.

FIG. 1 is a front view of an elastic coupling 1 in accordance with an embodiment of the present invention, and a cross sectional view along a line A-O-A thereof is shown in FIG. 2. Further, FIG. 3 shows a main portion in FIG. 2 in an enlarged schematic manner.

Figure 3:
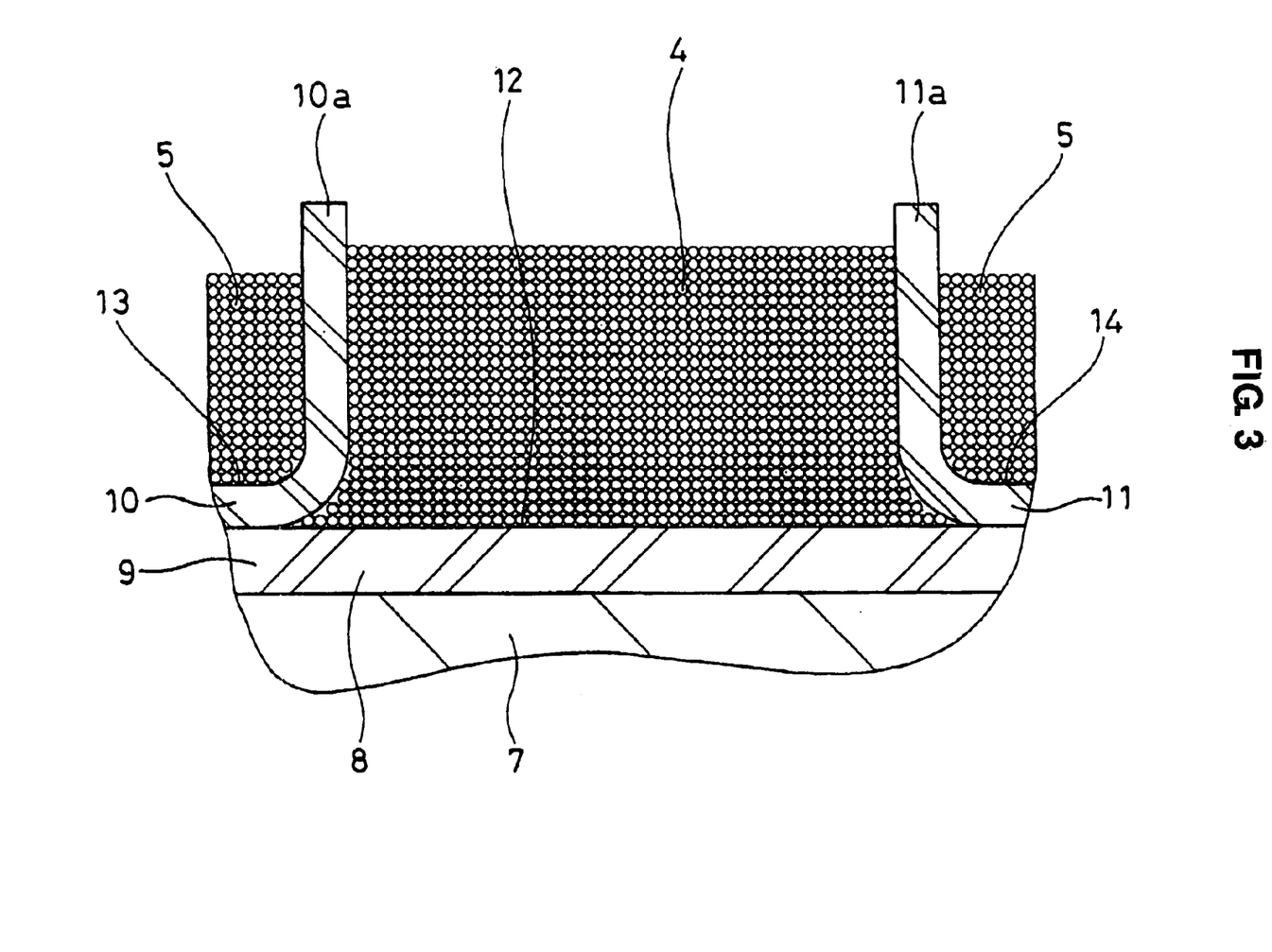
FIG. 3 is an enlarged view schematically showing a main portion in FIG. 2.

As shown in FIGS. 1 to 3, the elastic coupling 1 in accordance with the embodiment is structured by alternately arranging connection elements 2 connected to a drive side yoke in a rotation drive system of a motor vehicle and connection elements 3 connected to a driven side yoke on a circumference, winding cords 4 and 5 around every mutually adjacent connection elements 2 and 3 so as to form a band shape, and coating the connection elements 2 and 3 and the cords 4 and 5 by an elastic material 6 such as a rubber or the like, and is further structured as follows.

That is, first, each of the connection elements 2 and 3 is provided with a shaft 7 which is formed in a cylindrical shape so that a connection bolt for connecting to the yoke can be inserted to the shaft 7, a sleeve 9 which is fitted to an outer peripheral side of the shaft 7, and a pair of axial collars 10 and 11 which are fitted to a further outer peripheral side of the sleeve 9, and a bobbin 8 an outer periphery of which the cords 4 and 5 are wound around, is formed by the sleeve 9 and a pair of collars 10 and 11. Each of the collars 10 and 11 is formed in an approximately C-shape in its cross section in which an outer peripheral side is opened. A pair of collars 10 and 11 having the shape mentioned above are arranged with a predetermined interval in an axial direction, whereby there are formed three groove-like spaces 12, 13 and 14 sectioned by flange portions 10a and 11a of the respective collars 10 and 11. The drive side cord 4 bridged over one adjacent connection element on the circumference is wound around the center groove-like space 12 among these three groove-like spaces 12, 13 and 14, and the driven side cord 5 bridged over another adjacent connection element on the circumference is wound around each of the groove-like spaces 13 and 14 in both left and right sides.

Figure 4:
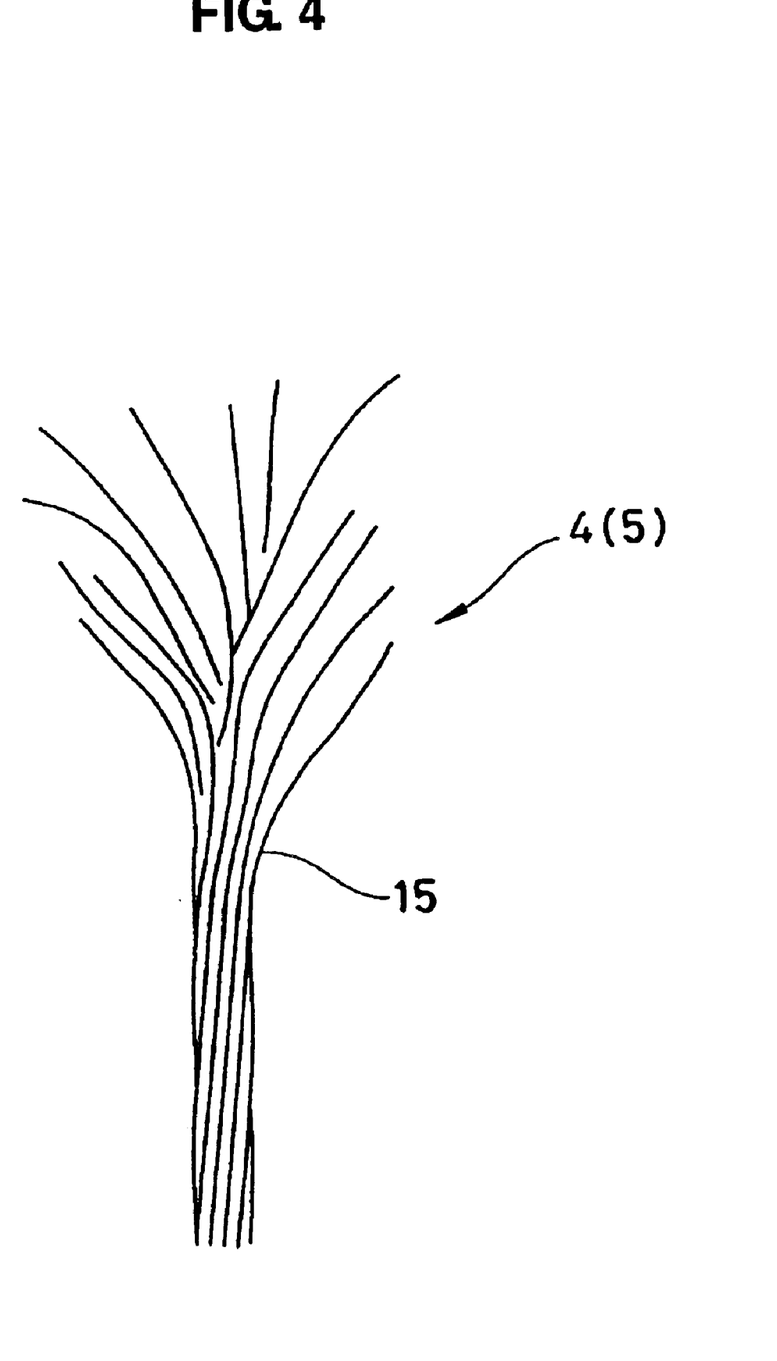
FIG. 4 is a partly enlarged view of a cord used in the elastic coupling.

Further, in the embodiment, each of the drive side cord 4 and the driven side cord 5 is formed by a cord having a smaller twist number than the conventional one, by using a polyester fiber or the like as a forming material, in particular, is formed by a single yarn formed by bundling filaments as shown in FIG. 4, and furthermore a single yarn 15 having a twist number of 10 times per 10 cm or less, or is formed by yarn obtained by bundling a plurality of single yarns having a twist number of 10 times per 10 cm or less at a bundling twist number of 10 times per 10 cm or less. In each of the cords 4 and 5, a cross sectional shape is an specified cross sectional shape (noncircular cross sectional shape) in which the displacement at a time of winding and the slack due to the digging at a time of transmitting the torque are hardly generated, or an uneven cross sectional shape in which the displacement at a time of winding and the slack due to the digging at a time of transmitting the torque are hardly generated. Further, a lower limit of the number of twists in the cords 4 and 5 may be zero, however, is preferably set to about 5 times per 10 cm which does not generate the snag.

Figure 5:
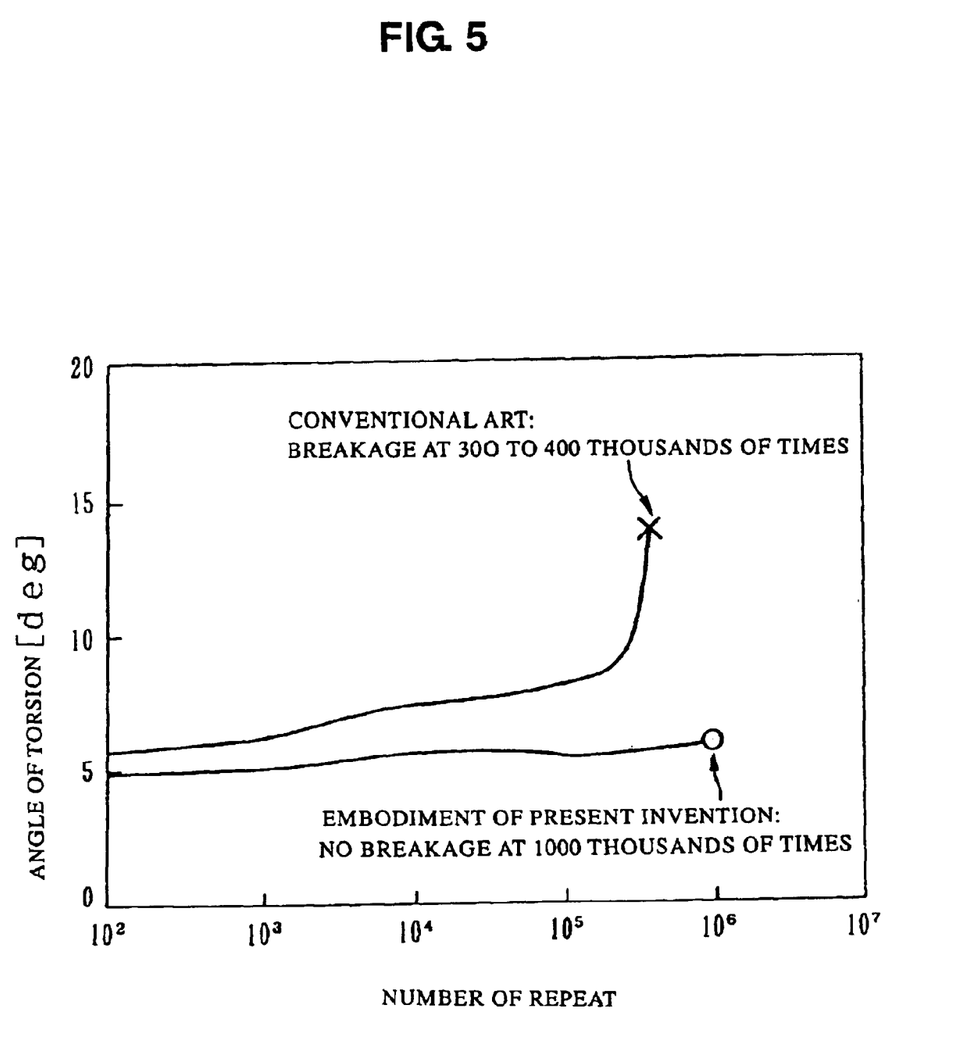
FIG. 5 is a graph showing results of a cord durability comparing test.

Therefore, when winding the cords 4 and 5 having the structure and the shape mentioned above around the connection elements 2 and 3, the cords 4 and 5 can be wound more densely than the conventional one, so that the displacement at a time of winding and the slack due to the digging at a time of transmitting the torque are hardly generated, and a uniform tensile force is applied to a whole of the cords 4 and 5. Accordingly, the cords 4 and 5 are hard to be broken, whereby it is possible to improve a durability of the cords 4 and 5. Results of a comparative test are as shown in FIG. 5.

Further, since the cords 4 and 5 are wound more densely than the conventional one, an occupied cross sectional area in the case of winding at particular turns is reduced. Therefore, it is possible to downsize the cord wound portion.

EFFECT OF THE INVENTION AND INDUSTRIAL APPLICABILITY

The present invention achieves the following effects.

That is, in the elastic coupling in accordance with each of the aspects of the present invention which is provided with the structure mentioned above, the cords can be wound more densely than the conventional one on the basis of the structure mentioned above. The displacement at a time of winding and the slack due to the digging at a time of transmitting the torque are hard to be generated. A uniform tensile stress is applied to the whole of the cords. Accordingly, the cords are hardly broken, and it is possible to improve a durability of the cords.

Further, since the cords can be wound more densely than the conventional ones on the basis of the structure mentioned above, the occupied cross sectional area in the case of winding at particular turns is reduced. Accordingly, it is possible to downsize the cord wound portion.

Further, in the case of the present invention, since the number of twists is zero or small, it is possible to prevent the filaments from being in contact with each other with the great angle, so that it is possible to improve the strength of the filament and it is possible to improve the durability. Further, since each of the filaments is arranged in a state of being nearly in parallel to the torque transmitting direction, it is possible to improve the strength of the filament, it is possible to improve the durability and it is possible to improve the torque transmission rate.

What is claimed is:

1. An elastic coupling for connecting a drive side yoke and a driven side yoke, said elastic coupling comprising first connection elements for connection to the drive side yoke, second connection elements for connection to the driven side yoke, said first connection elements and said second connection elements being alternately arranged on a circumference of the elastic coupling, a cord wound around each set of mutually adjacent connection elements so as to form a band shape of a plurality of cords, each cord being only a single yarn, the single yarn including a plurality of filaments, and a direction of each of the plurality of filaments of the single yarn extending substantially parallel to a load direction of rotational torque to improve durability and torque transmission rate, said first and second connection elements and the cords being coated by an elastic material.

2. An elastic coupling for connecting a drive side yoke and a driven side yoke, said elastic coupling comprising first connection elements for connection to the drive side yoke, second connection elements for connection to the driven side yoke, said first connection elements and said second connection elements being alternately arranged on a circumference of the elastic coupling, a cord wound around each set of mutually adjacent connection elements so as to form a band shape of a plurality of cords, each cord being only a single yarn, the single yarn including a plurality of filaments and having a twist number equal to or less than ten times per ten centimeters, and a direction of each of the plurality of filaments of the single yarn extending substantially parallel to a load direction of rotational torque to improve durability and torque transmission rate, said first and second connection elements and the cords being coated by an elastic material.

* * * * *